United States Patent [19]

Hattori

[11] Patent Number: 4,706,204
[45] Date of Patent: Nov. 10, 1987

[54] CONTROLLER FOR MOVABLE ROBOT FOR MOVING A WORK ELEMENT THROUGH A CONTINUOUS PATH

[75] Inventor: Shinichi Hattori, Nagasaki, Japan

[73] Assignee: Mitsubishi Denki Kabushiki Kaisha, Japan

[21] Appl. No.: 708,489

[22] Filed: Mar. 5, 1985

[51] Int. Cl.⁴ ................... G06F 15/46; G05B 19/42
[52] U.S. Cl. .................................. 364/513; 901/3; 901/9; 901/17; 901/42; 318/573; 228/7; 219/125.1; 364/169
[58] Field of Search ............... 901/1, 3, 4, 5, 7, 9, 901/16, 42, 41, 43, 50, 17; 414/730, 749; 364/169, 513, 168, 723; 318/573, 568; 228/7; 219/125.1

[56] References Cited

U.S. PATENT DOCUMENTS

| | | | |
|---|---|---|---|
| 3,486,012 | 12/1969 | Burnett et al. | 318/573 X |
| 3,518,513 | 6/1970 | Pomella et al. | 901/3 X |
| 4,201,937 | 5/1980 | Irie | 901/9 X |
| 4,409,650 | 10/1983 | Noguchi | 364/169 X |
| 4,415,967 | 11/1983 | Russell | 364/169 X |
| 4,445,022 | 4/1984 | Mori | 901/9 X |
| 4,445,184 | 4/1984 | Noguchi | 414/730 X |
| 4,550,383 | 10/1985 | Sugimoto | 364/723 X |

Primary Examiner—Joseph J. Rolla
Assistant Examiner—Edward S. Ammeen
Attorney, Agent, or Firm—Leydig, Voit & Mayer

[57] ABSTRACT

A control system for a movable robot, having a movable member which is linearly movable on and articulated about a base and having an articulated arm with a work element, executes a prestored continuous path program for moving the work element through a continuous path by simultaneous coordinated linear and articulation displacements of the movable member and arm in all degrees of freedom. These simultaneous coordinated displacements are produced by interpolating in advance the position of the movable member at a teaching point and by loading the interpolated position of the movable member into an interpolation calculation of the arm position.

14 Claims, 5 Drawing Figures

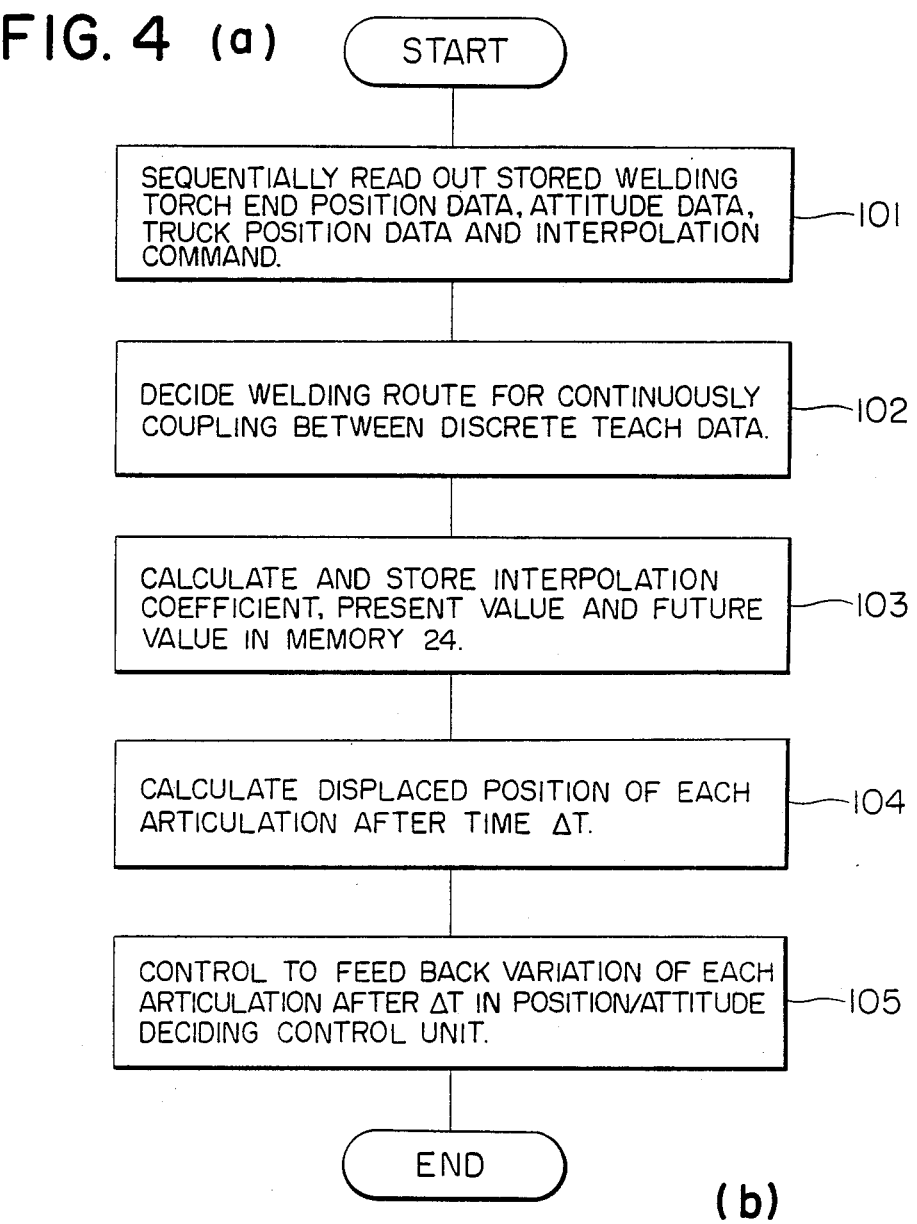
FIG. 4 (a)
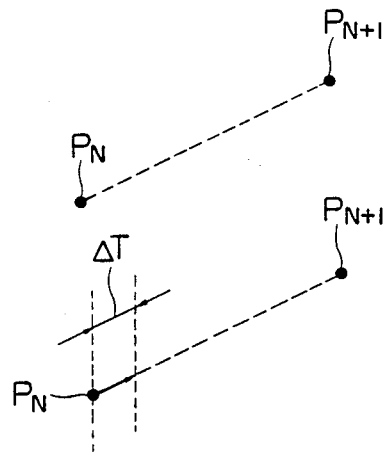
(b)

4,706,204

CONTROLLER FOR MOVABLE ROBOT FOR MOVING A WORK ELEMENT THROUGH A CONTINUOUS PATH

TECHNICAL FIELD

The present invention relates to improvements in a robot controller and, more particularly, to an improved controller for simultaneously playing back all movable elements of an arm and a movable member of a movable robot to move a work element through a continuous path defined by a series of prestored discrete points.

BACKGROUND OF THE INVENTION

A movable robot has a member linearly movable in the horizontal direction and an arm mounted on the movable member and vertically movable upwardly and downwardly. More particularly, a robot controller for such a robot plays back the points of a stored welding program by interpolating the position of the movable member as well as the position and the attitude of the arm.

The present invention relates to improvements in a robot controller for simultaneously playing back the prestored motions of an arm and an upright movable member of a movable robot.

In the playback operation of prior-art movable robots of this type, the control of an arm and the control of a movable member are independent, and the motions of the arm and the movable member of the robot are not simultaneously controlled. In other words, in prior-art robots, the movable member is first moved to and stopped at a predetermined position to be welded, the position of the arm is then interpolated, the movable member is thereafter moved and stopped again at another welding position, the arm position is again interpolated, and another welding operation is performed. In summary, prior-art robots operate for only discontinuous weldings.

However, when a considerable welding task is required on a workpiece, for example, when the weld required is long in length, the positioning of the movable member and the interpolation of the arm position are individually performed in prior-art movable robots. This is not only very troublesome, but also time consuming. Thus, prior-art robots have such drawbacks that the robot cannot simultaneously move its various articulated members and thus is restricted in the possible working range to the movable range of the arm.

SUMMARY OF THE INVENTION

The present invention overcomes the above-mentioned defects inherent in conventional movable robots. The present invention has as an object the provision of a controller capable of simultaneously playing back the prestored path of the motion of the arm and the movable member of a movable robot comprised of a sequence of prestored teaching points. This is achieved by interpolating in advance the position of the movable member at a teaching point and loading the position of the movable member thus interpolated in an interpolation calculation of the arm position.

BRIEF DESCRIPTION OF THE DRAWINGS

FIG. 4a is a flowchart diagram of a playback operation of the robot, and

FIG. 4b illustrates the consecutive teaching points and the route between the points.

In the drawings, the same symbols indicate the same parts.

DESCRIPTION OF THE PREFERRED EMBODIMENT

An embodiment of the present invention will be described below in conjunction with the accompanying drawings.

Figure 1:
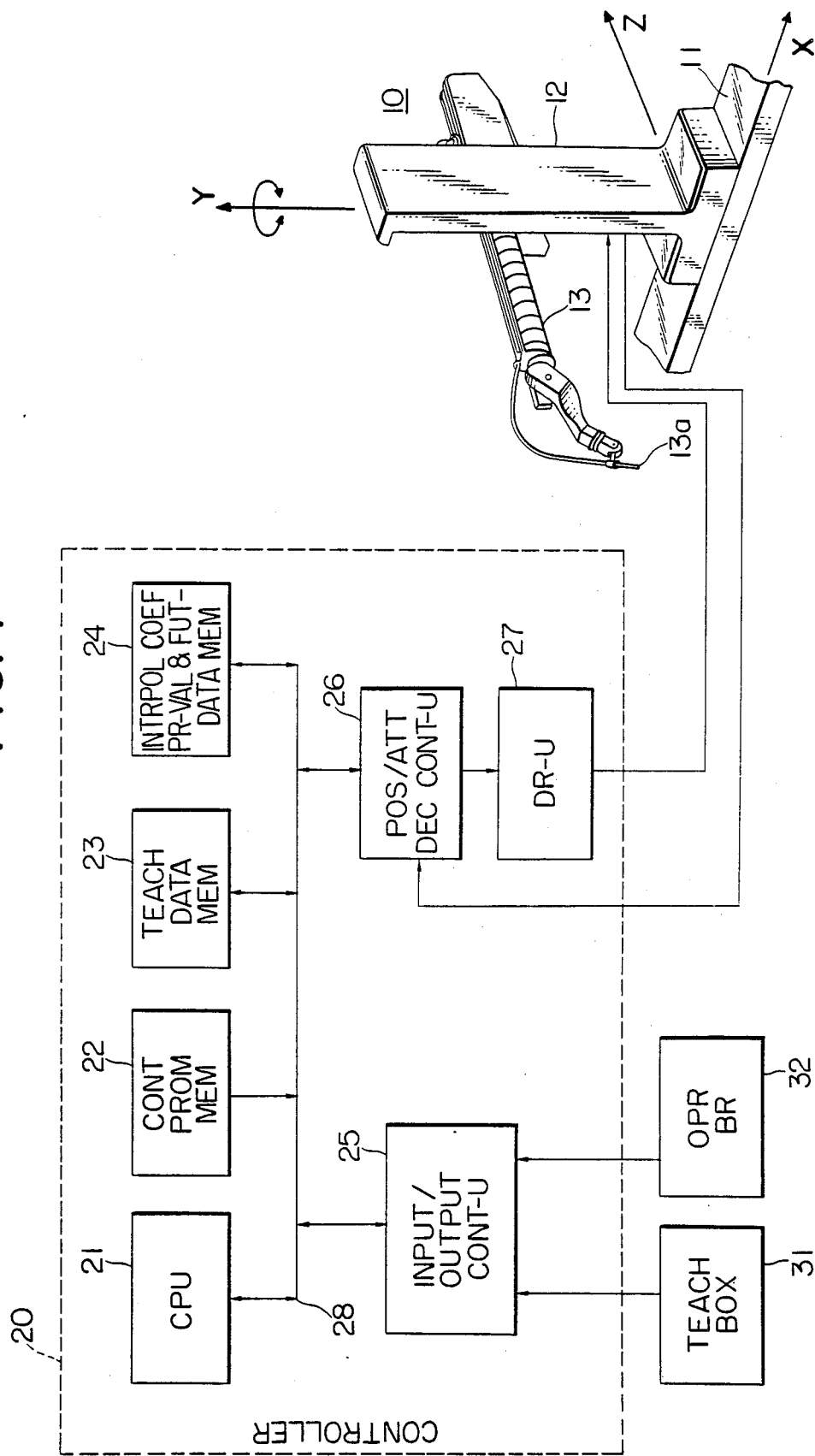
FIG. 1 is a block diagram showing a controller for a movable robot according to the present invention and a perspective view showing a movable robot controlled by the controller and having a movable member which is linearly movable on and articulates about the base and an articulated arm.

FIG. 1 is a block diagram showing a controller according to the present invention and a perspective view showing a movable robot wherein the controller controls a playback operation of prestored teaching point sequences simultaneously for an arm and a movable member of said robot. In FIG. 1, numeral 10 denotes a movable robot, which is constructed of a movable base 11, a movable member 12 linearly movable in a horizontal direction (in the X direction) on the base 11, and an arm 13 mounted on the movable member 12 to linearly move in a direction perpendicular to the base (in the Y direction). Numeral 20 denotes a controller comprising a central processing unit 21, a control program memory 22, a teach data memory 23, an interpolation coefficient present value and future data memory 24, an input/output control unit 25, a position/attitude control unit 26, a drive unit 27, and a common bus 28 for communicating a signal between the central processing unit 21 and the control program memory 22 to the control unit 26.

Figure 2:
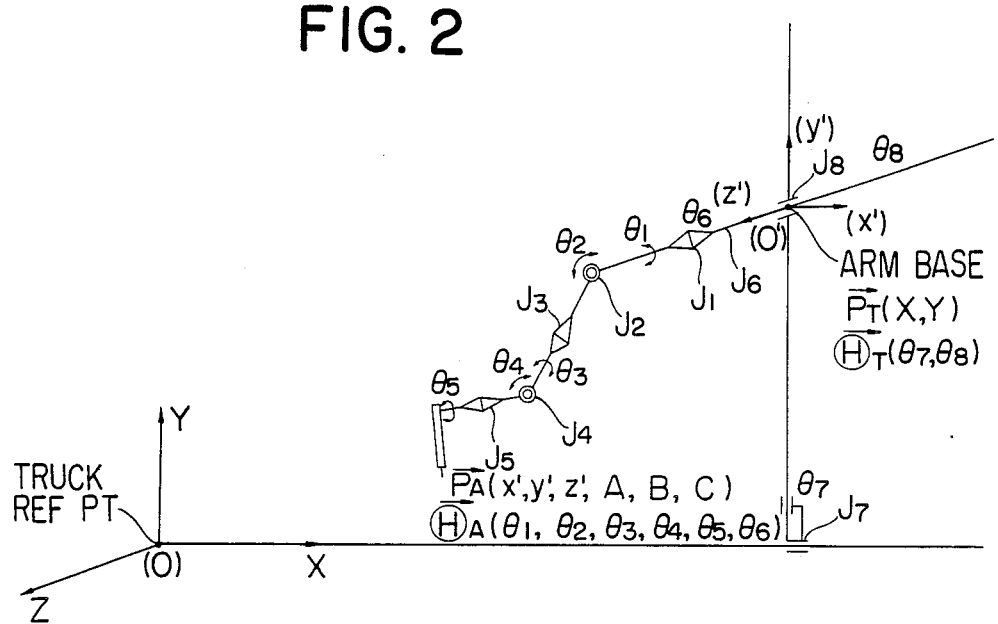
FIG. 2 is a view showing the coordinates of the robot.

FIG. 2 is a view illustrating two coordinate reference frames for the robot 10 having three orthogonally related axes each. In a first coordinate reference frame, a reference point of the movable member 12 is chosen as an origin 0 and in a second coordinate reference frame the intersection of the arm 13 with the movable member 12 is chosen as an origin 0'. In the second coordinate reference frame, the position of the end of a work element, herein shown as a welding torch 13A (FIG. 1), is represented by orthogonal coordinates including both linear and attitudinal coordinates. The linear coordinates representing the torch tip position along the three orthogonally-related axes are represented by (x', y', z'). The attitudinal coordinates defining the attitude of the torch 13A to each of the orthogonally related axes, i.e., the attitudes to the x'-axis, the y'-axis, and the z'-axis, are represented by the coordinates (A, B, C). Articulation coordinates describing the angular displacement of the arm's articulations $J_1, J_2, J_3, J_4, J_5, J_6$ are represented by $(\theta_1, \theta_2, \theta_3, \theta_4, \theta_5, \theta_6)$. Further, the orthogonal coordinates of the arm 13 are alternatively represented by an orthogonal vector representation $\vec{P}_A$ (x', y', z', A, B, C), and the articulation coordinates are alternatively represented by an articulation vector representation $\textcircled{H}_A(\theta_1, \theta_2, \theta_3, \theta_4, \theta_5, \theta_6)$. Then, the following relationship exists between $\vec{P}_A$ and $\textcircled{H}_A$.

$$\vec{P}_A = M_A \cdot \textcircled{H}_A \qquad (1)$$

$$\textcircled{H}_A = M_A^{-1} \cdot \vec{P}_A \qquad (2)$$

where $M_A$ represents a coordinate conversion matrix of the arm 13, and $M_A^{-1}$ represents an inverse coordinate transformation matrix of the arm 13.

In the first coordinate reference frame 12, the position of the movable member 12 is represented by orthogonal coordinates comprised of only linear coordinates represented by (X, Y), and the angles of articulations $J_7$, $J_8$ of the movable member 12 are represented by ($\theta_7$, $\theta_8$). The orthogonal coordinates of the movable member 12 are represented by an orthogonal vector representation $\vec{P}_T$(X, Y), and the articulation coordinates are represented by an articulation vector representation $\vec{H}_T(\theta_7, \theta_8)$. The following relations exist between them.

$$\vec{P}_T = M_T \vec{H}_T \quad (3)$$

$$\vec{H}_T = M_T^{-1} \vec{P}_T \quad (4)$$

where $M_T$ represents a coordinate conversion matrix of the movable member 12, and $M_T^{-1}$ represents an inverse conversion matrix of the movable member 12.

When the position of the end of the torch 13a is represented in the first coordinate reference frame in which the reference point of the movable member 12 represents the origin O, the linear coordinate vector $\vec{x}$ (x, y, z) of the torch 13a is represented by:

$$\vec{x} = \vec{x}' + \vec{X}$$

In other words, the vector is represented by:

$$\vec{X}x = \begin{Bmatrix} x \\ y \\ z \end{Bmatrix} = \begin{Bmatrix} x' + X \\ y' + Y \\ z \end{Bmatrix} \quad (5)$$

The orthogonal coordinate vector $\vec{P}$(x, y, z, A, B, C, X, Y) representing the end position and the attitude of the torch 13a and the position of the movable member 12 is defined by using the linear coordinate vector $\vec{x}$.

Figure 3:
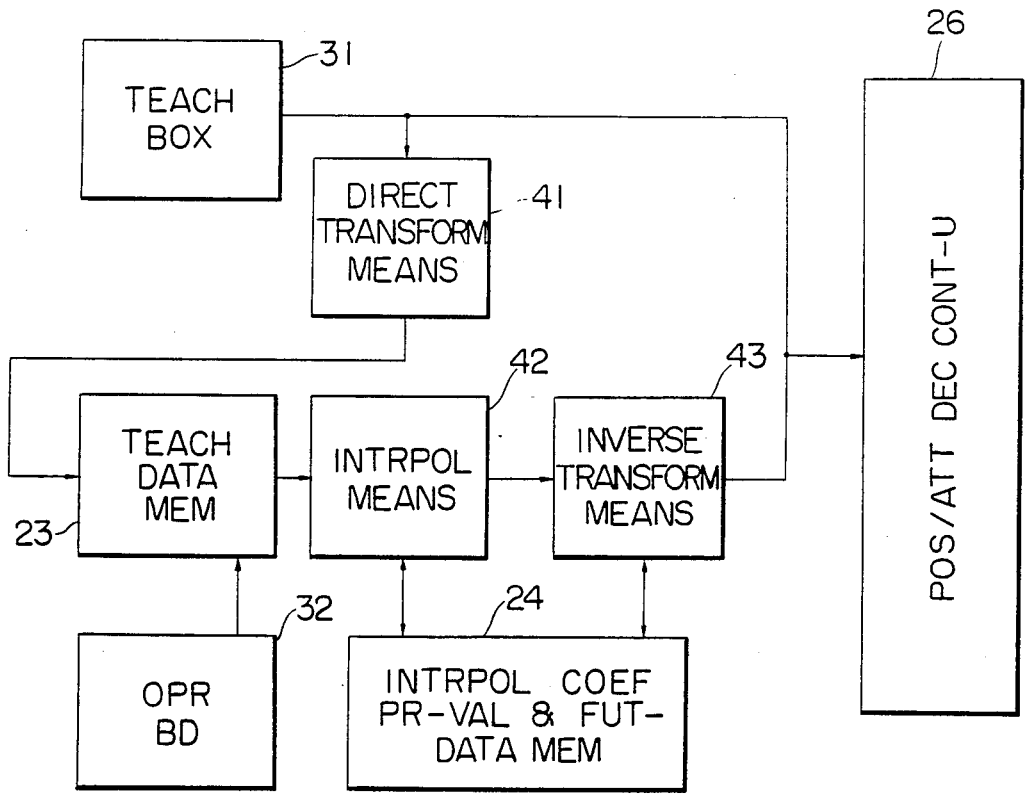
FIG. 3 is a logic block diagram of the functions of a central processing unit and position and attitude positioning controller.

FIG. 3 shows a block diagram of the functions of the central processing unit 21 and the position/attitude control unit 26. The operation of the controller of the present invention will be described in two parts with the block diagram: first the teaching operation, and then the playback operation. The robot 10 is taught the route of welding a workpiece at a teaching time as follows. Arm movement commands $\theta_1$ to $\theta_6$ and movable member movement commands $\theta_7$, $\theta_8$ represented in the articulation coordinates for the end positions and the attitude of the torch 13a, as well as the positions of the movable member 12 at a plurality of discrete points for forming a welding route, are sequentially input from a teaching box 31 through an input/output control unit 25 and a common bus 28 (FIG. 1) to a position/attitude control unit 26. This information is required to move the robot 10 by means of a drive unit 27 (FIG. 1). Simultaneously, the arm and movable member movement commands are also input to a direct transform means 41 (articulation-/orthogonal coordinates transform means) shown in FIG. 3. The direct transform means 41, via equations (1) and (5), produces the end position (x, y, z) of the torch 13a from articulation coordinates of the arm and the orthogonal coordinates of the movable member of the first reference frame. Further, the direct transform means 41 also produces the coordinates of the attitude (A, B, C) of the torch 13a from the linear orthogonal coordinates of the second reference frame (i.e., that reference frame in which the base of the arm 13 is coincident with the origin O'), and the position (X, Y) of the movable member 12 from the orthogonal coordinates of the first reference frame. The end position data of the torch 13a, the attitude data of the torch 13a, and the position data of the movable member 12 are sequentially stored in the teach data memory 23 as teach data. Further, a command relating to the interpolation system for continuously connecting a plurality of discrete points is also input from the teaching box 31 and stored in the memory 23.

The position/attitude control unit 26 will now be described in detail. The control unit 26 is composed of a digital servo (not shown). After performing an interpolation function in an infinitesimal time period $\Delta T$, the central processing unit 21 shown in FIG. 1 transfers the resulting angular displacements $\Delta\theta_1$ to $\Delta\theta_8$ required for the continuous connection of taught points to the central unit 26. This calculation is performed in accordance with the control program stored in the control program memory 22 (such as a ROM for example), and is sent through the common bus 28, and to the control unit 26. Then, the control unit 26 receives the displacements $\Delta\theta_1$ to $\Delta\theta_8$ and slowly processes to accelerate or decelerate the robot 10 by outputting a drive (speed) command from a position detector (not shown) provided in the robot 10 to the drive unit 27. This operation is performed such that an error amount from the position feedback of the position detector (not shown) becomes zero, thereby controlling the position and the attitude of the robot 10.

The central processing unit 21 serves a teaching function by inputting an operation command for remotely instructing an operation board 32 to weld via the robot 10 at the playback time. Then, the unit 21 reads the end position and attitude data of the touch 13A and the position data of the movable member 12, as well as an interpolation command stored in the memory 23, and inputs the above to an interpolating means 42 in FIG. 3 (as shown in step 101 in FIG. 4(a)). The teaching data has a plurality of consecutive first and second discrete teaching points $P_N$, $P_{N+1}$ as shown in FIG. 4(b). The interpolating means 42 must decide the path for continuously connecting the discrete points $P_N$ and $P_{N+1}$ (shown by a broken line) (as shown in step 102 in FIG. 4(a). To this end, the interpolating means 42, for example, employs three-dimensional rectilinear (i.e., first degree) interpolation for connecting the two points, but may employ an arcuate (i.e., second degree) interpolation for connecting the three points. Then, the following three-dimensional rectilinear interpolation is achieved so that the torch 13a and the movable member 12 move continuously and rectilinearly between the N-th teach data point $P_N$ and the (N+1)-th teach data point $P_{N+1}$.

When the teach data point $P_N$ is represented in orthogonal coordinates by an orthogonal vector representation $P_N$ ($x_N$, $y_N$, $z_N$, $A_N$, $B_N$, $C_N$, $X_N$, $Y_N$) and the teach data point $P_{N+1}$ is represented in orthogonal coordinates by an orthogonal vector representation $\vec{P}_{N+1}$ ($x_{N+1}$, $y_{N+1}$, $z_{N+1}$, $A_{N+1}$, $B_{N+1}$, $C_{N+1}$, $X_{N+1}$, $Y_{N+1}$), the oblique vector $\vec{\Delta N}$ ($\Delta x$, $\Delta y$, $\Delta z$, $\Delta A$, $\Delta B$, $\Delta C$, $\Delta X$, $\Delta Y$) of the rectilinear line $P_N P_{N+1}$ can be represented by the following equation (6).

$$\vec{\Delta N} = \begin{Bmatrix} \Delta x \\ \Delta y \\ \Delta z \\ \Delta A \\ \Delta B \\ \Delta C \\ \Delta X \\ \Delta Y \end{Bmatrix} = \begin{Bmatrix} x_{N+1} - x_N \\ y_{N+1} - y_N \\ z_{N+1} - z_N \\ A_{N+1} - A_N \\ B_{N+1} - B_N \\ C_{N+1} - C_N \\ X_{N+1} - X_N \\ Y_{N+1} - Y_N \end{Bmatrix} \quad (6)$$

The interpolating means 42 calculates the value of the vector $\vec{\Delta N}$ and stores the vector $\vec{\Delta N}$ as the three-dimensional rectilinear interpolation coefficient in the interpolation coefficient present value and future data memory 24 (as shown in step 103 in FIG. 4(a)).

Then, with the teach data point $P_N$ in the orthogonal coordinates as the present value orthogonal vector $\vec{P}_{CURR}$ ($x_{CURR}$, $y_{CURR}$, $z_{CURR}$, $A_{CURR}$, $B_{CURR}$, $C_{CURR}$, $X_{CURR}$, $Y_{CURR}$), the articulation coordinates for achieving this point are obtained by use of the inverse transform means 43 (orthogonal/articulation coordinate transform means) employing abovementioned equations (2) and (4). More particularly, the linear coordinate vector $X'_{CURR}$ ($x'_{CURR}$, $y'_{CURR}$, $z'_{CURR}$) of the orthogonal coordinates of the torch tip (13a) in the second coordinate reference frame is obtained by the following equation $$\vec{x}'_{CURR} = \vec{x}_{CURR} - \vec{X}_{CURR}$$

$$\begin{Bmatrix} x'_{CURR} \\ y'_{CURR} \\ z'_{CURR} \end{Bmatrix} = \begin{Bmatrix} x_{CURR} - X_{CURR} \\ y_{CURR} - Y_{CURR} \\ z_{CURR} \end{Bmatrix}$$

Further, the following equation is obtained by using equation (2), $$\vec{(H)}_{A\ CURR} = M_A^{-1} \cdot \vec{P}_{A\ CURR}$$

the following equation is obtained by using equation (4), $$\vec{(H)}_T = M_T^{-1} \cdot \vec{P}_{T\ CURR}$$

and the present value articulation vector $\vec{(H)}_{CURR}$ is obtained from the vectors $\vec{(H)}_{A\ CURR}$ and $\vec{(H)}_{T\ CURR}$ and stored in memory 24.

The future value orthogonal vector $\vec{P}_{NXT}$ represents the orthogonal coordinates after an infinitesimal time T. It is calculated by the following equation and stored in memory 24:

$$\vec{P}_{NXT} = \vec{P}_{CURR} + \Delta N \cdot \frac{F \cdot \Delta T}{Dl} \quad (7)$$

where vector $\Delta N$ produced by equation (6) is recalled as the three-dimensional rectilinear interpolation coefficient, F represents the speed of the end of torch 13A when the latter moves rectilinearly between points $P_N$ and $P_{N+1}$, and $$Dl = \sqrt{(x_{N+1} - x_N)^2 + (y_{N+1} - z_N)^2}$$

which represents the distance between consecutive first and second teaching points $P_N$ and $P_{N+1}$.

The linear coordinate vector $x_{NXT}$ ($x'_{NXT}$, $y'_{NXT}$, $z'_{NXT}$) of the orthogonal coordinates of the torch tip (13a) in the first coordinate reference frame is obtained similarly to the present value articulation vector $\vec{(H)}_{CURR}$ by the following equations:

$$\vec{x}'_{NXT} = \vec{x}_{NXT} - \vec{X}_{NXT}$$

$$\begin{Bmatrix} x'_{NXT} \\ y'_{NXT} \\ z'_{NXT} \end{Bmatrix} = \begin{Bmatrix} x_{NXT} - X_{NXT} \\ y_{NXT} - Y_{NXT} \\ z_{NXT} \end{Bmatrix}$$

Further, the following equations are obtained by using equations (2) and (4), $$\vec{(H)}_{A\ NXT} = M_A^{-1} \vec{P}_{A\ NXT}$$

$$\vec{(H)}_{T\ NXT} = M_T^{-1} \vec{P}_{T\ NXT}$$

The future value articulation vector $\vec{(H)}_{NXT}$ is obtained from the articulation vectors $\vec{(H)}_{A\ NXT}$ and $\vec{(H)}_{T\ NXT}$ and stored in memory 24.

The difference $\Delta \vec{(H)}$ between the present value articulation vector $\vec{(H)}_{CURR}$ and the future value articulation vector $\vec{(H)}_{CURR}$, called the articulation displacement vector, is represented as:

$$\vec{\Delta H} = \vec{(H)}_{NXT} - \vec{(H)}_{CURR}$$

This value comprises the angular displacements to be displaced by the articulations $J_1$ to $J_8$ during an infinitesimal time $\Delta T$ second, and this is transferred to the position/attitude control unit 26 (as shown in step 104 in FIG. 4(a)). The control unit 26 inputs a drive signal to the drive unit 27 so that articulations $J_1$ to $J_8$ take the calculated displacements after the infinitesimal time $\Delta T$. After the infinitesimal time $\Delta T$, the abovementioned future value vectors are stored as the present value vectors in the memory 24. The abovementioned sequence is repeated so that the robot is controlled to move in the interpolation path pointed out between the taught points.

When these controls are performed repeatedly at infinitesimal time periods $\Delta T$, the end of the torch 13a can move on the rectilinear line $P_N P_{N+1}$ at a speed F. The movable member 12 can move at a speed F.DL/Dl (where DL is calculated by $$DL = \sqrt{(X_{N+1} - X_N)^2 + (Y_{N+1} - Y_N)^2}$$

and represents the distance between the movable member's positions at the points $P_N$, $P_{N+1}$, and Dl represents the distance between these points). By virtue of the function described in step 105 in FIG. 4(a)), the end of the torch 13a can further follow up even if the speed F is varied at every time period $\Delta T$ second.

As set forth above, according to the present invention, the arm and the movable member of the movable robot are simultaneously controlled such that their prestored motions are played back. Therefore, the welding work can be continuously executed while moving the robot, the working range can be consequently expanded, and the working efficiency can be improved.

What is claimed is:

1. A control system for simultaneous, coordinated displacement of all degrees of freedom of the elements of a movable robot having
 a base,
 a member movable on the base along a first axis of a three orthogonally related axis first coordinate reference frame in which a reference point of the movable member is designated as an origin,
 an articulated arm carried by the movable member for movement along a second axis of the first coordinate reference frame and having an intersection with the movable member which is designated as an origin of a three orthogonally related axis second coordinate reference frame, said movable member and arm having articulations representing, by their articulation angles, linear positions of the movable member and arm within the two coordinte reference frames, and
 a work element carried by the arm for the performance of a task on a workpiece,
 said control system comprising:
 a drive unit connected to operate the movable member and arm which receives a command signal for causing simultaneous coordinated required linear and articulation displacements of the movable member and articulation displacement of the arm to produce desired attitudinal positioning of the work element,
 control means connected to said drive unit including
  means for receiving and means for storing representations of a plurality of discrete teaching points and attitudes of the work element, which teaching points, when connected, define a desired continuous path of travel of the work element,
  means for performing displacement calculations using the stored discrete teaching point representations in orthogonal coordinates, converted using the two coordinate reference frames to equivalent articulation coordinates, for determining the simultaneous coordinated required linear and articulation displacements of the movable member and arm in all degrees of freedom to satisfy a chosen path continuously connecting the discrete teaching points, said displacement calculation means producing output representations based on the displacement calculations for moving the work element, with the desired attitude, through the chosen continuous path, and
  position/attitude control means for receiving the output representations of the required displacements produced by said displacement calculation means as input, for calculating required accelerations in all degrees of freedom in the motions of the movable member and arm called for to achieve the required displacements, and for providing an output command signal to said drive unit for producing the required accelerations of the movable member and arm.

2. A control system according to claim 1 wherein said means for receiving representations of a plurality of discrete teaching points includes transform means receiving articulation coordinates for all articulations of the movable member and arm and linear coordinates of the movable member as measured in the first reference frame, and performing a transform function producing orthogonal vector representations of the discrete teaching points, each of said vectors being defined by orthogonal coordinates comprising work element attitudinal coordinates, linear coordinates of both the work element and movable member as measured in the first reference frame, and linear coordinates of the work element as measured in the second reference frame.

3. A control system according to claim 2 wherein said means for storing the representations of a plurality of discrete teaching points includes a teach data memory.

4. A control system according to claim 3 wherein said displacement calculation means includes interpolation means which:
 receives orthogonal teaching point vector representations of consecutive discrete teaching points, respectively defining a segment of the desired continuous path through which the work element will be moved, the teaching points being converted to the orthogonal teaching point vector representations by said transform means and being stored in said teach data memory and received therefrom by said interpolation means as input,
 calculates a path for continuously connecting the consecutive teaching points by employing first or second degree interpolation for the path connecting the teaching points,
 calculates an interpolation coefficient by interpolating between the consecutive orthogonal teaching point vector representations, the coefficient being a vector representing the total displacement between the discrete teaching point orthogonal coordinates.

5. A control system according to claim 3 wherein said displacement calculation means includes interpolation means which:
 receives first and second orthogonal teaching point vector representations of first and second consecutive discrete teaching points, respectively defining a segment of the chosen continuous path through which the work element will be moved, the teaching points being converted to the first and second orthogonal teaching point vector representations by said transform means and being stored in said teach data memory and received therefrom by said interpolation means as input,
 calculates an interpolation coefficient by calculating the difference between the first and second orthogonal teaching point vector representations, the coefficient being a vector representing the total displacement between the first and second discrete teaching point orthogonal coordinates.

6. A control system according to claim 4 wherein said displacement calculation means iteratively calculates incremental displacements of the movable member and arm required to achieve the desired work element travel through the segment of the continuous path, and iteratively produces a corresponding command signal for transmission to said position/attitude control means which, through control of said drive unit, operates the movable member and arm to change the position of the work element by incremental displacements between the consecutive discrete teaching points until the total displacement between the points represented by the interpolation coefficient has been traveled by the work element, thereby achieving the work element travel between the points along a chosen continuous path.

7. A control system according to claim 6 wherein said displacement calculation means performs iterative incremental displacement calculations simultaneously for both the arm and the movable member.

8. A control system according to claim 7 wherein said displacement calculation means begins the iterative incremental displacement calculation for the continuous path connection between consecutive discrete teaching points by defining a present value orthogonal vector which assumes the value of the orthogonal vector representation of a first teaching point, the position of which is assumed by the work element as a starting position for the connection between the first and a second consecutive teaching points, the present value orthogonal vector being stored in an interpolation coefficient present value and future data memory.

9. A control system according to claim 8 having said displacement calculation means where the present value orthogonal vector, defined by the orthogonal coordinates of a first teaching point currently occupied by the work element, is converted by an inverse transform means to an alternative equivalent representation defined by a present value articulation vector comprising all articulation coordinates assumed by the articulations of the movable member and arm in order to position the work element in a corresponding location described by the present value orthogonal vector, which present value articulation vector is stored in said interpolation coefficient present value and future data memory.

10. A control system according to claim 9 in which said interpolation means, using a known work element velocity denoted by the symbol F, a value for an infinitesimal time period denoted by the symbol $\Delta T$ equal to the duration of one iteration in the iterative incremental displacement calculation, the distance between a first and a second consecutive teaching points denoted by the symbol $D_1$, the interpolation coefficient denoted by the vector symbol $\overrightarrow{\Delta N}$, and the present value orthogonal vector denoted by the vector symbol $P_c$, performs the following calculation in determining a future value orthogonal vector denoted by $P_n$:

$$P_n = P_c + \overrightarrow{\Delta N} \times [F \times \Delta T / D_1]$$

which future value orthogonal vector is stored in said interpolation coefficient present value and future data memory and which vector represents the orthogonal coordinates of a next position to be assumed by the work element as a next position in the iterative incremental displacement of the work element in the continuous path connection of consecutive teaching points.

11. A control system according to claim 10 in which said inverse transform means converts the future value orthogonal vector into an alternate equivalent representation defined by a future value articulation vector comprising the articulation coordinates assumed by the articulations of the movable member and arm in order to position the work element in a corresponding position described by the future value orthogonal vector.

12. A control system according to claim 11 wherein said displacement calculation means calculates an articulation displacement vector representing the difference between the present value and future value articulation vectors, which articulation displacement vector comprises the articulation displacements required in the articulations of the movable member and arm to move the work element from the position described by the present value orthogonal and articulation vectors to the position described by the future value orthogonal and articulation vectors, which articulation displacements are represented by the output displacement representations transmitted to said position attitude control means.

13. A control system according to claim 12 wherein said position attitude control means which receives the output displacement representations of the displacement calculation means, calculates required accelerations in all degrees of freedom in the motions of the movable member and arm called for to achieve the required displacements necessary to satisfy the chosen path, and provides an output command signal corresponding to the accelerations of said drive unit which controls the articulations of the movable member and arm to produce the required displacements.

14. A control system according to claim 13 in which, after the infinitesimal time of one interation during which the work element has assumed the position described by the future value orthogonal and articulation vectors, the future value orthogonal and articulation vectors are stored as present value orthogonal and articulation vectors in the interpolation coefficient present value and future data memory, and another iterative incremental displacement calculation is performed, the iterations continuing until the work element has reached the second of the consecutive teaching data points.

* * * * *